April 29, 1952 G. C. GRAHAM Re. 23,483
WASHING MACHINE
Original Filed Nov. 30, 1939 7 Sheets-Sheet 1
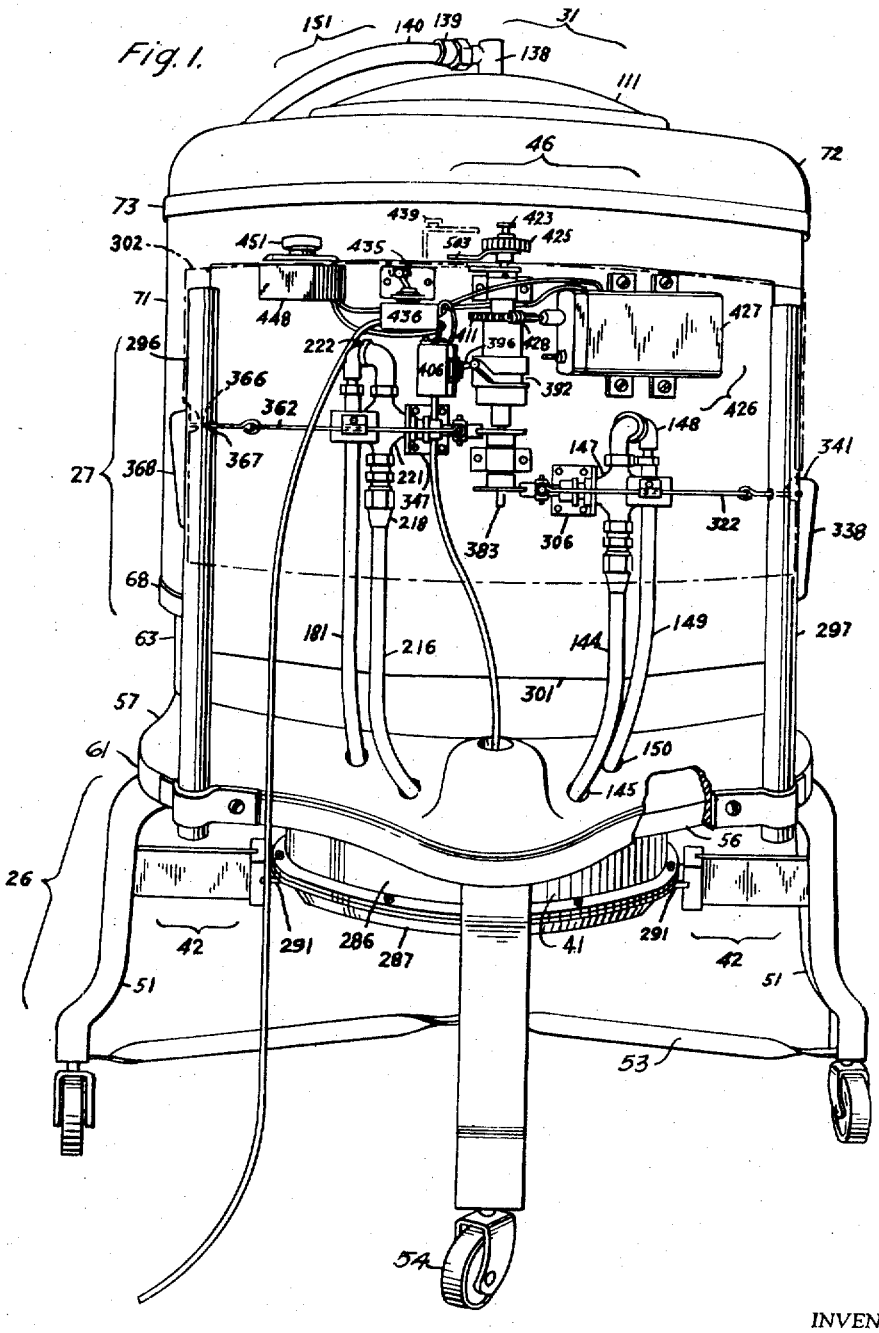
INVENTOR.
George C. Graham
BY M. Theodore Simmons
ATTORNEY.

WASHING MACHINE
Original Filed Nov. 30, 1939 7 Sheets-Sheet 2
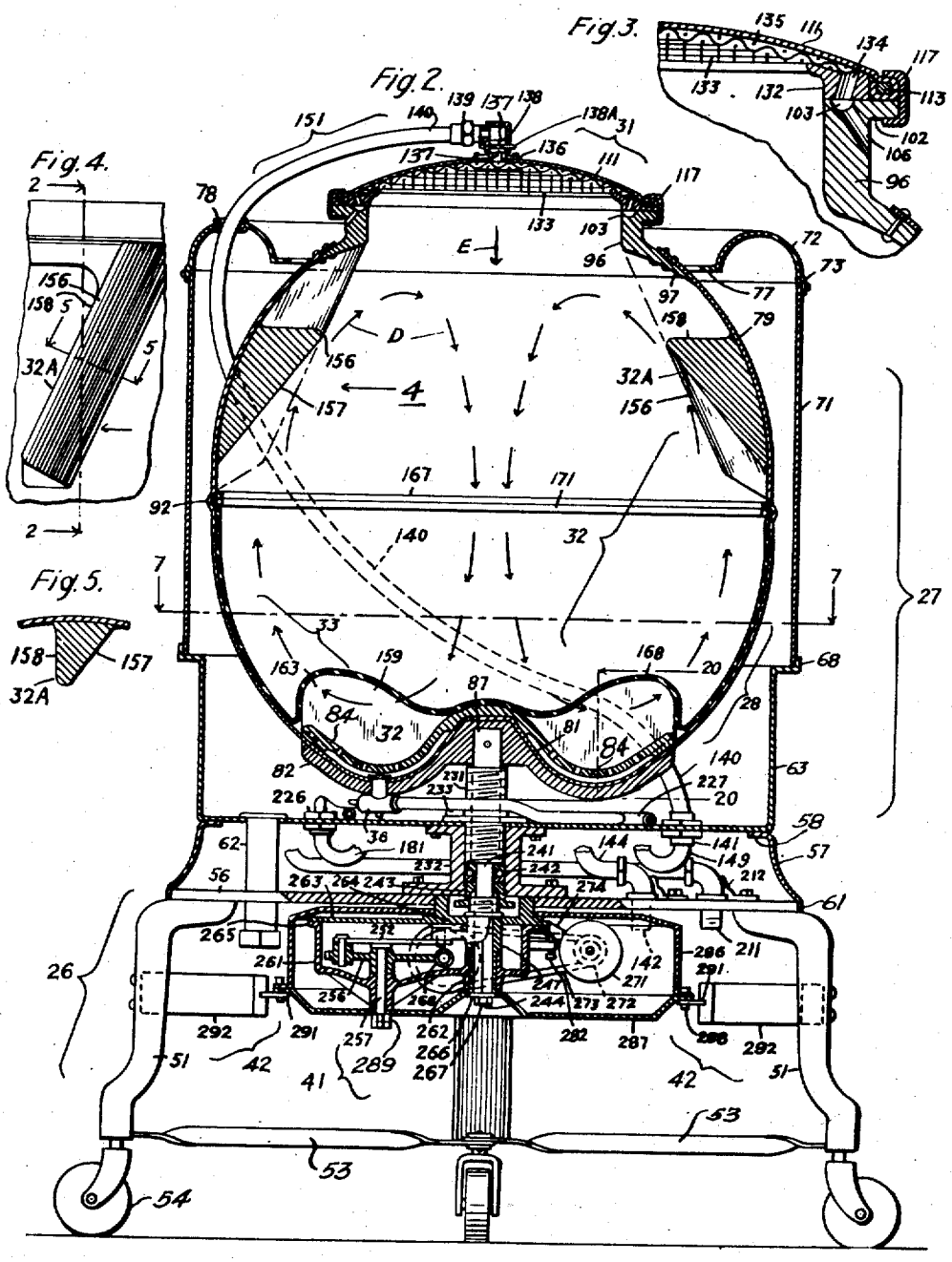
INVENTOR.
George C. Graham
BY M. Theodore Simmons
ATTORNEY.

April 29, 1952 G. C. GRAHAM Re. 23,483

WASHING MACHINE

Original Filed Nov. 30, 1939 7 Sheets-Sheet 3

INVENTOR.
George C. Graham
BY H. Theodore Simmons
ATTORNEY.

April 29, 1952 G. C. GRAHAM Re. 23,483
WASHING MACHINE
Original Filed Nov. 30, 1939 7 Sheets-Sheet 4
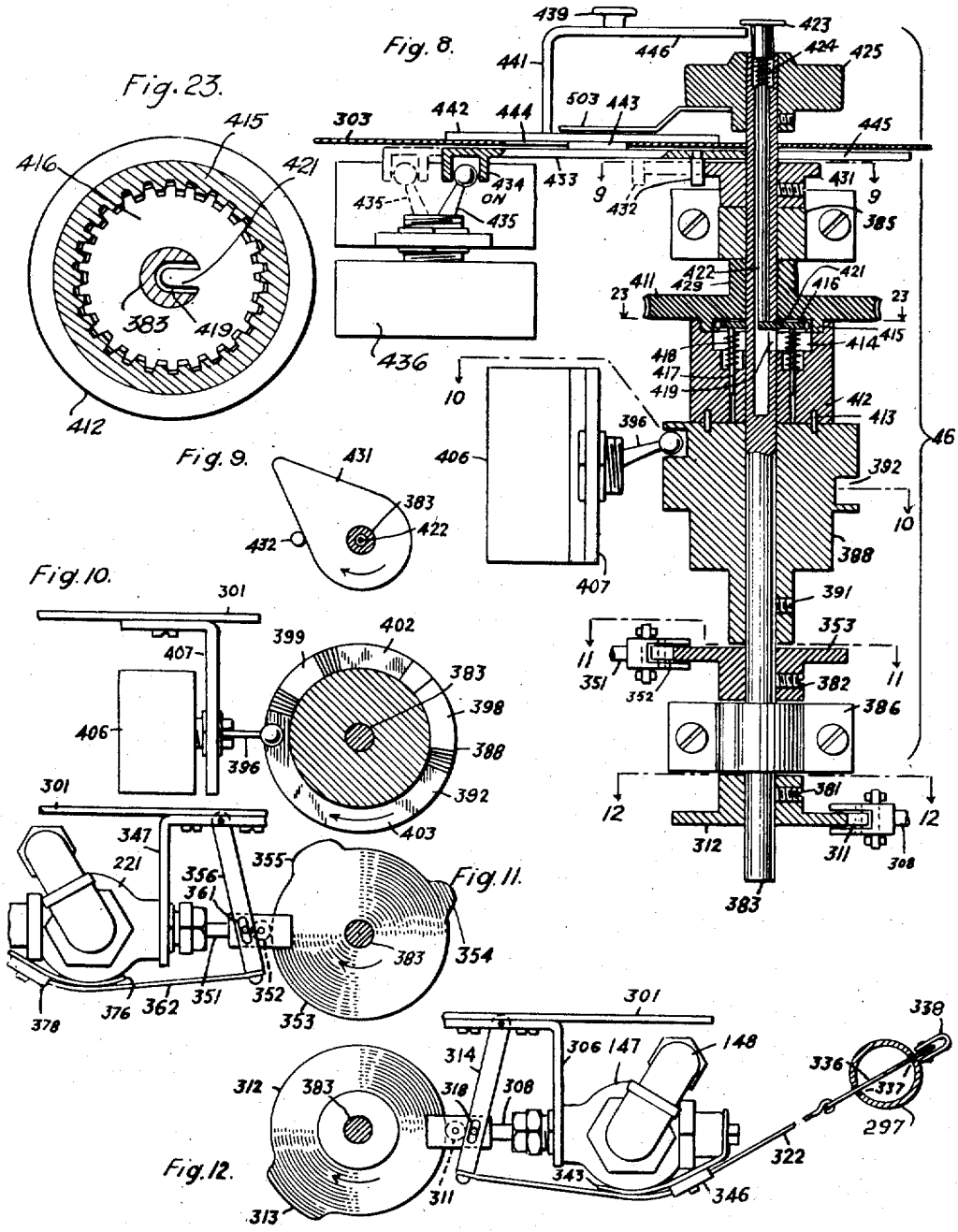
INVENTOR.
George C. Graham
BY
M. Theodore Simmons
ATTORNEY.

WASHING MACHINE

Original Filed Nov. 30, 1939 7 Sheets-Sheet 5

INVENTOR.
George C. Graham
BY M. Theodore Simmons
ATTORNEY.

April 29, 1952 G. C. GRAHAM Re. 23,483

WASHING MACHINE

Original Filed Nov. 30, 1939 7 Sheets-Sheet 6

INVENTOR.
George C. Graham
BY M. Theodore Simmons
ATTORNEY.

WASHING MACHINE

Original Filed Nov. 30, 1939 7 Sheets-Sheet 7

INVENTOR.
George C. Graham
BY M. Theodore Simmons
ATTORNEY.

Reissued Apr. 29, 1952 Re. 23,483

UNITED STATES PATENT OFFICE 23,483

WASHING MACHINE

George C. Graham, Ridgewood, N. J., assignor, by mesne assignments, to Graham & Barker, Ridgewood, N. J., a limited partnership Original No. 2,407,660, dated September 17, 1946, Serial No. 306,797, November 30, 1939. Application for reissue September 15, 1947, Serial No. 774,071

33 Claims. (Cl. 68—12)

Matter enclosed in heavy brackets [ ] appears in the original patent but forms no part of this reissue specification; matter printed in italics indicates the additions made by reissue.

My invention relates to washing machines or devices, exemplified herein as applied for household laundry purposes, and more particularly to improvements in such machines, as well as to sequence steps of operation and control thereof.

In devices of this character heretofore suggested, many factors have entered into the problem of rendering them simple, effective, economical and more desirable over a wide field of use, among which are such elements as water supplies of different and varying pressures and flow in different and in the same localities, the character and times of agitation which different clothes should have, the construction of various parts of the machines, the particular manner of flushing and drying the clothes, the number, mounting and operation of power units for operating and controlling the machines, and many other features which must be properly combined and operated together to produce a machine that is efficient, easy to use, and free from trouble. Accordingly, the advance of the art has resulted in the suggestion of many expedients, from the earliest hand operated machines through the era of power operated machines, requiring manual control of each step, followed by somewhat complex attempts at automatic control of power operated units, taking the character of segregated single-step attempts at different parts of a sequence; later purporting to sustain a certain succession of steps constituting less than a required number; and finally, being applied even to the latter, whereby all of the steps, beginning with the dry clothes and ending with the clothes washed and "dried," or partially dried, were effected without attention, but not satisfactorily.

With such attempts and concept, many complications arose, such as intricate mechanical arrangements, delicate control means, such as electrical switches, relays and the like, and other features which, although sometimes producing a general result of the kind sought, are sources of trouble in manufacture and use, cause stoppages in the course of the attempted automatic cycle, are difficult, if not impossible, for the average user to repair, are expensive, and have other disadvantages.

It is among the objects of my invention to overcome such deficiencies, and to produce a machine in which all operations essential to quick, effective washing, flushing, rinsing and drying of clothes are effected in automatic succession, in a simple, trouble free and economical manner.

Another object of the present invention is to have certain of these steps overlap each other, thereby introducing a very novel feature in the machine and the method of cleaning clothes in the way of increasing efficiency, conserving time, energy, expense, wear on machine parts, and other advantageous results.

Another object of the invention is to compensate for variable factors affecting the operation of the machine, such as the water pressure at a particular locality where the machine is to be employed, as by varying the movement of a timing or control element for regulating the sequence steps.

Another object of the invention is to provide novel adjusting and index means, together with an interlock, individually and in combination, whereby the motor for operating the timing element must be deenergized, or the timing element otherwise disconnected from its drive before such adjustment may be made.

Another object of the invention is to provide novel circulation of water, and novel movement of clothes, in a washing machine, whereby to effect better interchange of position of the water and clothes, as between the bottom and top of a tub, to ensure effective cleaning, incident to which are the provision of novel agitator or baffle means, a particular water inlet, and other elements.

Another object of the invention is to provide a top construction for a washing machine of the upright tub type, that is novel in the provision of a fluid conduit structure for feeding water into the top of the tub, in a part of such structure in which the conduit constitutes substantially a hinge between the tub lid and a housing for the tub, in a screen at the inner side of the lid toward which the clothes are moved for flushing, and against which they are pressed for drying, and in certain elements of the screen, the lid and the tub top for conducting the water out of the tub, cleaning the screen, and other operations.

Another object of the invention is to provide a dryer of the diaphragm type that advantageously, and in novel manner, is molded to conform to agitator means in the tub, that has novel mounting in the tub, that, upon expansion of the diaphragm, increases a sealing effect between the diaphragm and the tub, and that has other advantages.

Another object of the invention is to provide a novel resilient or shock-absorbing means for a power unit of a washing machine, exemplified as of the oscillating type.

Another object of the invention is to provide a novel arrangement for supplying fluid for operating a diaphragm within the tub, as by providing a horizontal-plane spiral conduit which at the same time conserves space, as between a movable tub and a stationary housing in which the tub is disposed, thereby to reduce the overall height and size of the machine.

Another object of the present invention is to provide mechanism and a control whereby agitation of the clothes and water is had in the course of a flushing operation and also a rinsing operation, as well as during the selected washing period.

Another object of the present invention is to provide a machine in which the soiled clothes are put into the machine in dry condtion, and the entire cycle of washing, flushing, rinsing and drying are automatically and sequentially carried out in the tub, so that at the conclusion of the cycle the operator removes the cleaned clothes in so-called "dry" condition.

With such objects in view, as well as other advantages which may be incident to a utilization of the improvements, individually or in combination, the invention comprises the elements, steps and combinations thereof herein set forth and claimed, with the understanding that the several necessary elements constituting the same may be varied in proportion, arrangement and texture, without departing from the spirit and scope of the invention as intended, and as set forth in the drawings, specification and claims.

In practicing the invention, the broad method and structure on which it is based include, in one form, the steps, and means for carrying the steps into practical effect, of washing, starting a flushing action before agitation of the clothes stops, stopping agitation, continuing the flushing action after agitation has stopped, stopping the flushing action, starting to rinse the clothes, reviving agitation for a period of rinsing, stopping the rinsing action and starting a drying action during the revived agitation, stopping agitation before the end of the drying period, and finally cutting off all activity and energization of the machine as a whole; these steps being alterable and variously combinable with certain thereof omitted or other steps included within their own novel scope, and so far as other features of the invention are concerned, as to time, degree of overlap with each other, if any between certain of the steps, and other features.

In order to render the invention more clearly understood, steps are described, and means are shown in the accompanying drawings for carrying the invention into practical effect, without limiting the improvements to the particular elements shown and described, which for the purpose of explanation, are made the subject of illustration.

In the drawings:

Figure 1 is a front perspective view, on a reduced scale, of a washing machine of a particular type constructed in accordance with the invention, a front cover, which normally conceals certain of the parts, being indicated merely by dot-and-dash lines, so that such parts appear in full lines;

Fig. 2 is substantially a central vertical-plane section of the machine, viewed in the direction of Fig. 1;

Fig. 3 is an enlarged detail sectional view of parts appearing at the upper right-hand portion of Fig. 2;

Fig. 4 is a view showing a fragmentary detail of an agitator or baffle element, as viewed in the direction of an arrow 4 of Fig. 2;

Fig. 5 is a sectional view, taken along the line 5—5 of Fig. 4;

Fig. 8 is a considerably enlarged view, partially in central vertical plane section and partially in elevation, of a control device seen near the upper central portion of Fig. 1;

Fig. 9 is a view of one of the cams, taken along the line 9—9 of Fig. 8;

Fig. 10 is a view of another of the cams, taken along the line 10—10 of Fig. 8;

Fig. 11 is a view, a portion of which is taken along the line 11—11 of Fig. 8, and the remainder of which is of parts cooperating with the parts shown along such line;

Fig. 12 is a view, a portion of which is taken along the line 12—12 of Fig. 8, and the remainder of which is of parts cooperating with the parts shown along the line 12—12;

Fig. 23 is a view in enlarged detail taken along the line 23—23 of Fig. 8 showing the clutch mechanism.

MACHINE IN GENERAL

Figure 6:
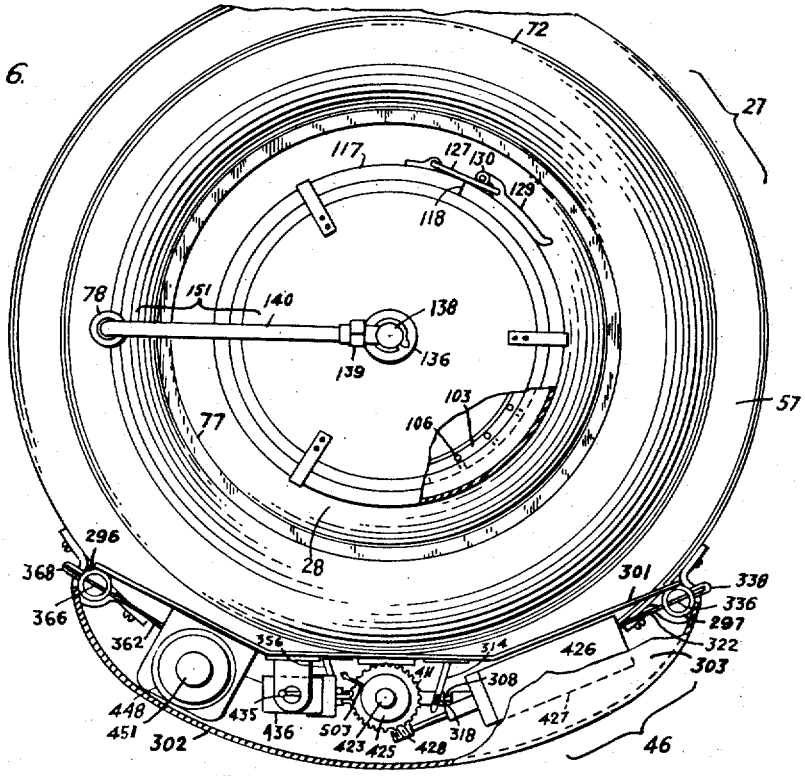
Fig. 6 is a top plan view of the structure of Figs. 1 and 2, parts being broken away, and parts being shown in section.
Figure 7:
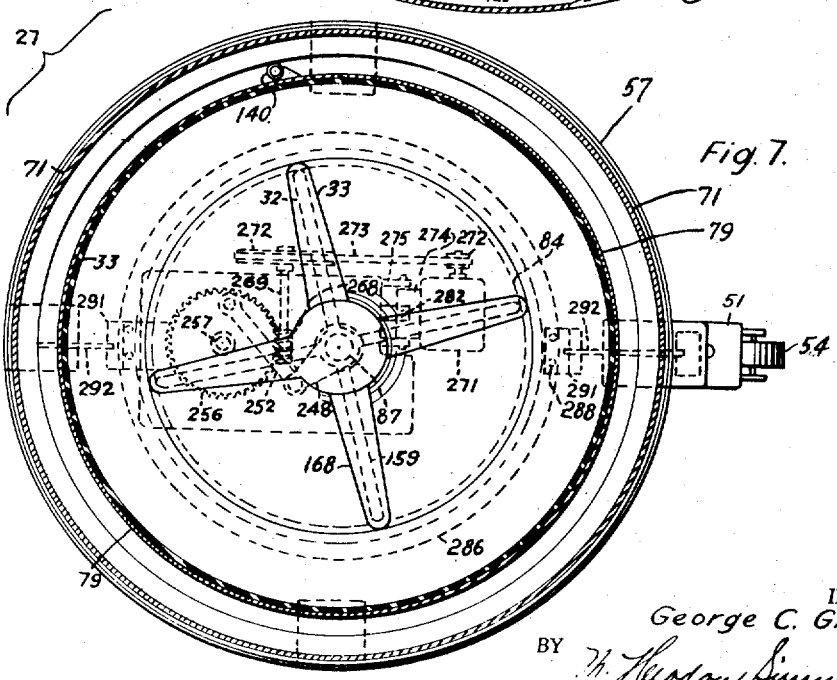
Fig. 7 is a sectional view, taken substantially along the line 7—7 of Fig. 2.

Under this heading, the identities and locations of all the major parts or groups of parts of the machine are given merely by way of outline, which will be followed by separate detailed description of these parts or groups under succeeding headings.

Referring particularly to Figs. 1, 2, 6 and 7, the example of the machine therein illustrated comprises a lower base 26 (Figs. 1 and 2), an upper stationary housing 27 on the base 26, an oscillatory tub 28 disposed generally in the housing 27, but having a special top or lid construction 31 extending above the housing, means 32 at the bottom and 32A near the top of the tub for agitating the clothes and water in the tub during washing, flushing, and rinsing actions, a diaphragm 33 in the tub for effecting flushing and drying actions by expansion of the diaphragm, a valve 36 (Figs. 2 and 13) under the tub for admitting fluid behind the diaphragm and in part controlling operation of the diaphragm 33, a power, or tub oscillating, unit assembly 41 supported by the base 26 under the housing 27, shock absorbing suspension means 42 for the power unit 41 associated therewith, and an automatic control mechanism 46 mounted on one side of the housing 27.

LOWER BASE STRUCTURE

The base structure 26, which may be any one of several different types for supporting the other parts and causing the top of the machine to have a certain convenient level suitable to the average user, has legs 51, at least two of which, as seen in Figs. 1 and 2, are suitable in location and construction for cooperation with the shock absorbing suspension means 42, as will later be described. The legs 51 are, in this instance, of pressed metal having channel section, joined at the lower ends, as by tie rods 53, and suitably supporting at the tops a metal or other disc or plate 56, preferably by means (not shown) for detachably mounting the legs in position. Castors 54 of the swivel type on the legs 51, provide for the easy movement of the machine from one position to another on a floor, in a usual manner.

The plate 56 is surmounted by a shell or ring 57 of thin pressed sheet metal having a horizontal peripheral top flange 58 for attachment to the housing 27, and a peripheral bottom flange 61 telescoping and suitably held to the plate 56.

THE HOUSING

The housing 27 encloses the tub 28, and other parts, and receives wash and rinse water ejected from the top of the tub, as will later appear. A pipe 62, extending from the bottom of the housing through the plate 56, is indicated for appropriately draining the housing 27. The housing comprises a thin sheet metal lower cup like portion 63, having an upper vertical peripheral flange 68 to which is secured an upper thin sheet metal cylindrical member 71. At its upper end, the cylinder 71 is provided with an annular thin sheet metal shell or cap 72 having an offset perimeter 73 secured to the top periphery of the cylinder 71. The remainder of the cap 72 is of substantially half round section, forming a relatively large upwardly convex bead or toroid, having a relatively small horizontal, radially inwardly extending flange 77 about the upper part of the tub 28 and in closely spaced relation thereto. A bushing 78 is provided in an opening in the cap 72, for a purpose to be hereinafter set forth.

THE TUB

The tub 28 (Fig. 2) is of the oscillating type for operation about a vertical axis, relative to which its sheet metal body 79 is of somewhat elongated globe shape having a clothes receiving opening at its top, and being shaped at its upper and lower portions for the reception of, and cooperation with, baffle elements of agitator means which will be later described.

Figure 22:
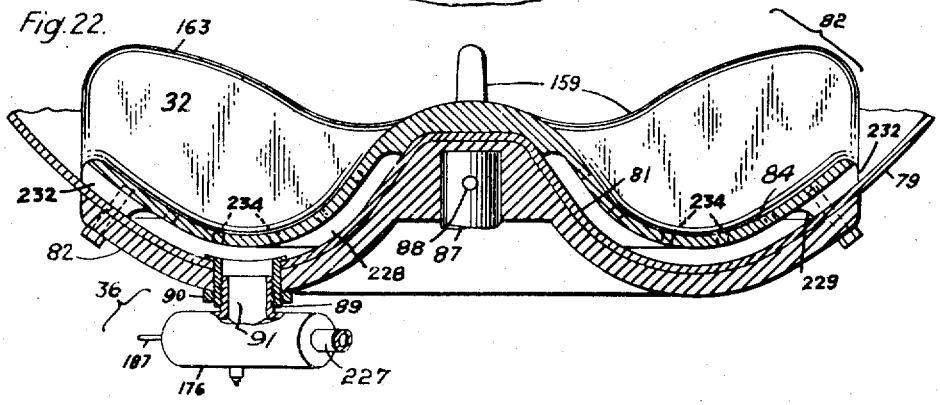
Fig. 22 is a sectional view of the lower portion of the tub and agitator in enlarged detail.

The tub has a portion 81 pressed upwardly at the tub bottom (Fig. 2). Disc-like metal mounting element 82 is provided outside the tub bottom, and a disc-like agitator base 84 (see also Fig. 22) is provided inside the tub bottom, these elements conforming to the shape of the tub and also extending about the portion 81, and being secured to the tub as by rivets.

The bottom mounting 82 has a recess for the reception of the upper end of a drive shaft 87 which is operatively connected to the mounting 82, this connection being indicated by the pin 88 which cooperates with a suitable slot. The lower portion of the tub and the mounting 82 also have registering apertures in which an internally and externally threaded bushing 89 is clamped by the nut 90. The tube 91 of the valve 36, for controlling the diaphragm movements as will be further set forth, is received in this bushing.

At about its vertical central portion the body 79 of tub 28 is provided with a peripheral channel 92, Fig. 2, open at the inner side of the tub and constituting part of means for attaching the diaphragm 33 to the tub, as also will further appear.

The top of the tub has secured thereto a metal casting 96, of cylindrical or ring-like character, having a depending tapered flange 97 conforming, at its outer surface, to the inner surface of the sheet metal body 79 of the tub, and having its inner surface gradually merging and curving into the curved inner surface of the sheet metal body whereby to preserve the gradually rounded inner top contour of the tub. The neck portion of the casting 96 has an outwardly projecting peripheral flange 102, in the top of which is a groove 103 (Fig. 3). A plurality of peripherally spaced ducts or outlet ports 106 extend diagonally downwardly and outwardly through the casting 96 from the groove 103 to the exterior of the tub, for allowing water from the tub to drain into the housing 27 through the radially narrow peripheral space between the flange 77 on the shell 72 and the upper part of the sheet metal tub.

The lid 31 comprises plate 111 constructed of sheet metal pressed to inverted shallow substantially dish shape. The metal of the lid at its periphery encircles a ring 113 (Fig. 3), of square cross section, which forms a flange that overlies and cooperates with the flange 102. Mounted concentrically with the ring 113 is a frame 132 between which and the lid 111 is disposed a rigid screen 133 conforming in general to the shape of the lid 111. The frame 132 is appropriately secured to the lid and has peripherally spaced, downwardly extending ducts 134 which communicate at their lower ends with the peripheral groove 103 and at their upper ends with the screen openings.

Figure 16:
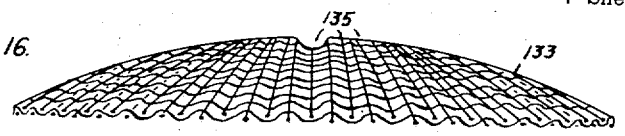
Fig. 16 is a slightly enlarged detail view in side elevation, of a screen structure shown in Fig. 3, and at the top of Fig. 2.

The screen 133, as better seen in Fig. 16, is of large mesh and also has radial top grooves or corrugations 135 which, when the clothes mass is pressed against the screen by the diaphragm, form gutters or channels for better draining off the water outwardly through the space between the ring 132 and plate 111, downwardly through the ducts 134 into the top annular groove 103, and thence through the ducts 106, into the housing 27, as above mentioned. Before the clothes are tightly pressed against the screen, the main bulk of the wash or rinse water being displaced by the diaphragm flows freely outwardly into the ducts 134 through various parts of the screen, irrespective of the grooves 135. It should be noted that while the drawings show the ducts 106 and 134 substantially in register, this is by no means necessary, the groove 103 with its ducts 106 being of sufficient capacity to carry off the water admitted to the groove by the ducts 134 regardless of the respective locations of the ducts along the groove.

The lid 111 is removably held upon the tub by a clamping ring 117 of channel section which embraces lid flange 113 and tub flange 102 when the lid is in place on the tub. Referring to Fig. 6, the ring is split as indicated at 118 and provided with operating means for peripheral expansion of the clamping ring to release the lid for opening and for peripheral contraction of the ring for locking the lid in closed position. The operating means comprises a link 127, pivotally secured to the ring 117 at one side of the split 118 and to a cam handle 129 which, in turn, is pivotally mounted upon the lug 130 located at the other side of the split 118. Raising the handle 129 expands the ring 117 and lowering the handle to the position shown in Fig. 6 contracts the ring. The linkage is locked in the closed position as the link 127 passes below the pivot of the handle on the lug 130.

At the top outside center of the lid 111, an aperture therein is surrounded by a nipple 136 (Fig. 2) attached thereto, on which is a grooved ferrule 137. A cap like member 138 has a rotative water sealed relation to the nipple, and is provided with a spring clip 138A, the end of which passes through an opening in the cap and engages in the groove of the ferrule. The cap 138 is connected by a coupling 139 to a flexible conduit 140 of the metal armored type. The conduit extends through the bushing 78, and between the housing 27 and the tub 28 to a nipple 141 in the bottom wall of the housing. Water is supplied to the conduit 140 from an inlet connection 142, secured to the bottom disc 56, through a hose or conduit 144, which extends through an opening 145 (Fig. 1) in the shell 57, to a valve 147 of the automatic control mechanism 46, and from the valve 147 through a connector 148, and a hose or conduit 149, extending through an opening 150 in the shell 57, to the nipple 141, to which the conduit 140 is connected. A suitable source of heated water may be connected to the inlet 142.

The section 151 of the flexible armored conduit 140 (Figs. 1, 2 and 6) acts somewhat as a hinge, or flexible mechanical connector, between the housing 27 and the lid 111, whereby to prevent complete separation of the lid from the tub when the lid is open, and serving to hold it in convenient position for closing the tub. Also, the section 151 of the conduit 140, may telescope back and forth through the bushing 78 to avoid buckling of the conduit and to better control the action of opening and closing the tub. The construction and arrangement of the water supply conduit and the association thereof with the lid are claimed in my co-pending application Serial No. 651,498, filed March 2, 1946.

THE AGITATOR MEANS

Although agitation or stirring of the clothes and water may be obtained by agitating means operating relative to a stationary tub, in the example here given it is obtained by baffles fixed to the oscillating tub whereby the water and clothes are given a special tumbling action, this action being substantially in accordance with the arrows D during washing, and combined with, or augmented by, the action of fresh incoming water in the direction of an arrow E, shown at the top of Fig. 2, during rinsing. Either or both sets of baffles 32 and 32A may be used, and either or both may be incorporated in the tub by being pressed therein, as will be apparent.

The upper agitator baffles 32A are here shown as integral parts of the top metal casting 96, although they may be separately attached thereto, or to the tub, or constitute parts of the tub body as indicated, and may be varied in number, two being here shown located on opposite sides of the tub. They are, as better illustrated in Figs. 4 and 5, of fin-like character rounded at the inner thinner edges 156, and tapered on one side, as indicated at 157 to merge gradually into the inner surface of the tub body, while the opposite side 158 of each baffle is straight, presenting a flat, radially extending side. The flat sides of the baffles 32A face in the same direction with respect to the direction of tub oscillation, for a purpose to be referred to later. The edges 156 slope downwardly and inwardly from the casting 96, substantially as chords of the cross sectional arc of the tub body 70, to a position close to the mid channel 92, where they are suddenly sloped into the tub surface.

The broad sides of the baffles extend in a general radial direction to the tub axis at any horizontal section, but longitudinally, they slope relative to the vertical at an angle of about twenty-five degrees, as better seen in Fig. 4, and in opposite directions, respectively. The cross section of each of these baffles is actually, and substantially, as shown in Fig. 5, the apparent thicker section thereof indicated in Fig. 2, being caused by the vertical cut therethrough along the line 2—2 of Fig. 4. This section also requires that only the upper part of the left hand baffle, and the lower part of the right hand baffle, as viewed in Fig. 2, be shown in full lines, and that the lower part of the left hand baffle and the upper part of the right hand baffle be shown in dot and dash lines, since looking into the baffles along the line 2—2 of Fig. 4, as is actually the case in Fig. 2, would only show the upper part of the left hand baffle, and the lower part of the right hand baffle, as will be understood.

Figure 20:
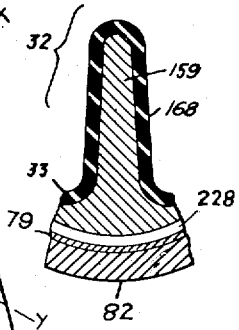
Fig. 20 is a sectional view, on an enlarged scale, taken substantially along the line 20—20 of Fig. 2.
Figure 21:
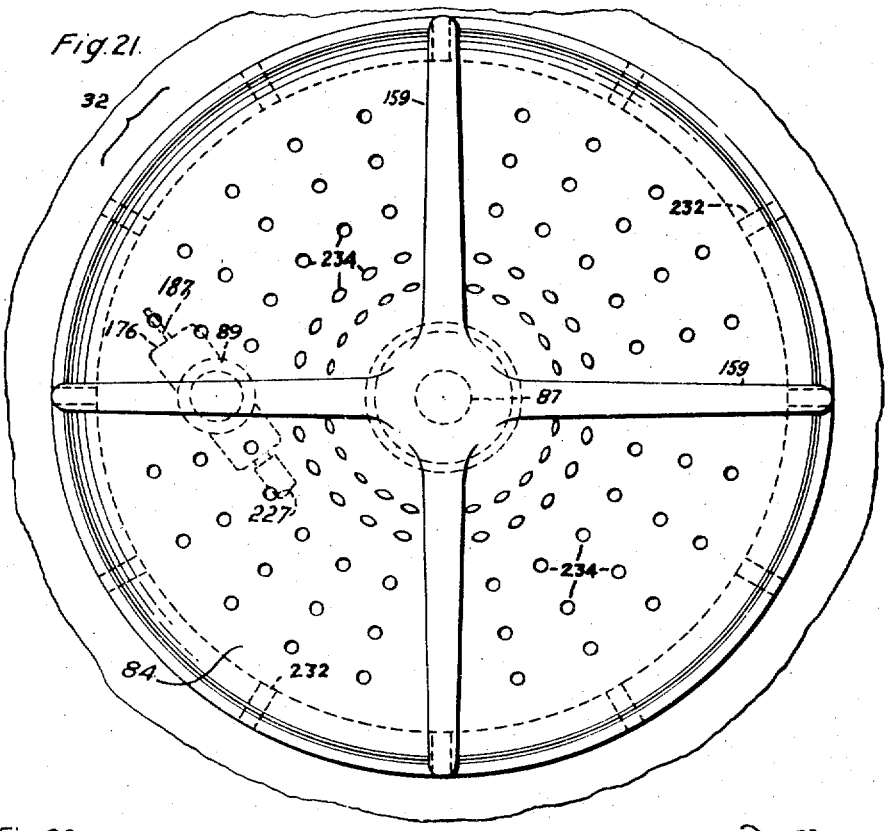
Fig. 21 is a plan view of the lower agitator.

Lower agitator 32 (Figs. 2, 7 and 20–22) comprises the disc-like base 84, on which are a plurality of baffles 159 which extend radially from the center (Fig. 21). At the upper edges the baffles are rounded and the sides divergingly tapered to the base, as seen in Fig. 20. In vertical plane outline the baffles are each of generally curved or rounded contour conforming somewhat to the lower recess of the tub, and having outer enlarged portions 163. These baffles, in relation to such recess and to the globular rising sides of the outer portions of the tub, cause the water and clothes mass to be impelled radially outwardly and upwardly along the sides of the tub, and if uninterrupted would move downwardly immediately in the center thereof. However, at the top the clothes encounter the agitation produced by the upper baffles which will break up the cycle produced by the lower agitator and keep the clothes well spread out. This agitation is a combination of actions.

The length and the angular disposition of the baffles tends to and does lift the clothes along the baffles, and turns them over. The baffles are of greatest radial depth midway the length thereof so that as the tub oscillates on its vertical axis the greatest force exerted upon the clothes is radially inwardly along and opposite these mid-sections. However, the sections of the baffles above the mid-portions exert a more or less downward component of movement toward and along the axis of the tub, and the sections of the baffles below the mid-portions exert a thrust radially inwardly. The result of all of these forces is to cause considerable agitation of the clothes in the upper portion of the tub as they are moved inwardly and before they are carried downwardly in the center.

During rinsing, the central downward movement is augmented by the fresh rinse water entering the tub in the direction of the arrow E. At the same time, the fresh water is introduced and mixed in definite and symmetrical manner, ensuring its diffusion to all parts of the clothes mass, and avoiding rinsing more at one part than at another, as will appear.

In addition to the described actions of the upper baffles 32A, they form a further function in augmenting the thorough cleansing action on the entire clothes mass. Since the tub oscillates on a vertical axis and the baffles have flat sides facing in the same direction, as these sides move forwardly they engage the clothes mass and move it part way around the tub circumferentially to occupy a different position with respect to the main forces exerted by the lower baffles. As these baffles move in the reverse direction the clothes mass slides off the slanting faces thereof. The next forward motion of the flat sides of the baffles engages a different portion of the clothes mass, and thus the clothes are moved around the vertical axis with a step by step motion, in addition to all the other movements imparted thereto. The above described construction and arrangements for agitating the clothes, together with the method of agitating, are being claimed in my co-pending application Serial No. 651,497, filed March 2, 1946.

AGITATOR POWER UNIT

The power unit herein described is the main drive motor and mechanism for oscillating the tub to agitate the clothes, as distinguished from other drive means hereinafter set forth for actuating the automatic control mechanism 46.

The drive shaft 87 (Fig. 2) is journaled in a relatively long sleeve bearing 231 having exterior screw threads, whereby it is vertically adjustably mounted in tubular post 232, and it is fixed in adjusted position by a nut 233. The post 232 has a top flange bolted to the bottom of the tub housing 27, and a bottom flange bolted to the bottom disc 56. The drive shaft 87 has a lower portion 241 of reduced diameter providing a shoulder which rests on a ball bearing 242 that is held in place by a gland 243 through which the shaft portion 241 extends. Below the portion 241 the shaft is of square cross section which terminates in a threaded end 244. The sleeve 247 of a crank arm 248 (see Fig. 7 also) fits upon the squared portion of the shaft 87, and is pivotally connected to one end of a link 252. The other end of the link 252 is pivotally connected to a worm wheel 256, the pivotal connection being eccentrically located thereon. The shaft 257 of the worm wheel is mounted on the bottom of lower casing 261 which also carries a bearing 262 for the sleeve 247. The upper portion 263 has a bearing 264 for the sleeve 247. The casing portions 261 and 263 have cooperating outer flanges 265 appropriately bolted together. This mechanism is supported upon the lower end of shaft 87 by a washer 266 and nut 267, which is suitably locked in place.

A worm screw 268 on shaft 269 engages the worm wheel 256 and is driven by motor 271 through pulleys 272 and belt 273. Motor 271 is supported on an arm 274 that is pivotally mounted on projection 275 extending from the upper casing portion 263. A screw 282, mounted in the flanges 265 of the casings 261 and 263, cooperates with the arm 274 for adjusting the position of the motor on its pivot mounting whereby to regulate the tension in the belt 273. In operation, when the motor 271 is energized, it causes continuous rotation of the worm wheel 256, which is translated into oscillating motion of the crank arm 248 and consequently of the drive shaft 87 and the tub.

A casing for the entire drive mechanism comprises an upper shell 286 secured to a lower pan 287 by bolts 288. The pan 287 is secured to the gear casing 261, 263 by the nut 267 and a nut 289 on the lower end of shaft 257. The bolts 288 also secure laterally extending plates 291 to the pan at radially opposite parts thereof. The plates 291 are connected to leaf springs 292, of the shock absorber devices 42, which in turn are secured to two of the legs 51 of the machine. Near the ends of its strokes, the oscillating structure has its motion damped by the yieldability of the springs 292 in a direction circumferentially of the drive shaft, the springs being rigid in the up and down direction. This damping means is being claimed in my aforesaid copending application Serial No. 651,497.

FLUSHING AND DRYING MEANS

Other pressure diaphragms or contracting chamber type drying means have been heretofore suggested, but not in the form herein developed or with the advantages as will appear. In the present instance also, the diaphragm is employed not only as means for drying the clothes, but also as means for effecting a flushing action.

The diaphragm 33 hereof is made of high grade durable soft rubber, having sufficient weight, body or thickness to be firm and positive in action, of long life, and sufficiently flexible to ensure its ready response to expansion and contraction, as well as its ready conformation to the clothes mass whereby to insure uniform effective pressure thereon. It has also the novel distinction of being molded such that, in its contracted or relaxed state, it not only conforms closely to the shape of the tub, but also to the agitator baffles 159, and to other parts of the lower agitator 32, as will be explained.

The diaphragm is somewhat semi-spherical in shape, having an upper edge peripheral bead 167, Fig. 2. An expansion ring 171 engages the upper peripheral part of the diaphragm, just under the bead 167, pressing the same into the channel 92 formed in the tub side wall; this ring having sufficient expansive force to hold the diaphragm securely in place, but not necessarily enough in itself to provide a perfect water seal against the pressure imposed thereon, especially when the diaphragm is being extended to its utmost upper positions during the drying operation. When the diaphragm is expanded upwardly, which action tends to turn it inside out, it wraps itself about the ring 171. Since downward slippage of the top edge of the diaphragm is prevented by the bead 167, and the pressure on the inner side of the ring by the diaphragm prevents contraction of the ring, the diaphragm acts on the ring with a substantially snubber effect, thus increasing the sealing effect of the bead 167, and adjacent parts of the diaphragm, against the tub body 79 in and adjacent to the channel 92, and against the ring.

At its bottom (see Figs. 2 and 20) the diaphragm is further provided with portions 168 of inverted substantially channel section closely conforming to, and in relaxed condition fitting over the baffles 159. During expansion, the diaphragm lifts off the bottom of the tub, rising from the baffles and, since it does not turn relative to the tub, returns easily and accurately to position fitting the baffles; this action being ensured by the wider open lower portions and the gradually curved lower edges of the channel sections of the diaphragm, shown in Fig. 20, conforming to the curves of the baffles joining them to the base 84.

Figure 13:
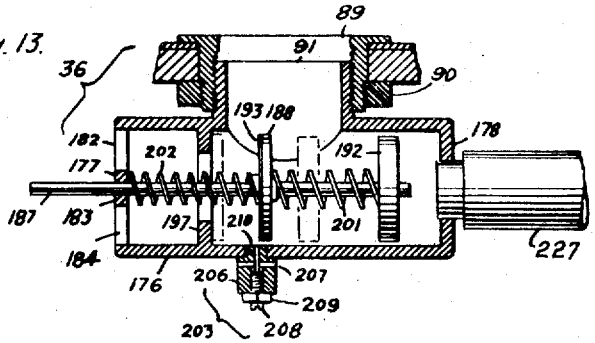
Fig. 13 is an enlarged view, partially in side elevation and partially in central vertical plane section, of a diaphragm valve seen near the left central portion of Fig. 2.

The flow of water to and from the space between the diaphragm 33 and the bottom of the tub, to expand and contract the diaphragm, is controlled by the diaphragm valve 36, indicated in Fig. 2 but better illustrated in Fig. 13, which is governed by the control mechanism 46, to be hereinafter particularly pointed out.

The valve comprises the tube 91 communicating with a cylinder 176 having end portions 177 and 178, the latter of which constitutes an end closure for the cylinder, from which a conduit or hose 181 extends to the control mechanism 46. The portion 177 is in the form of a spider having legs 182 supporting a central journal bearing 183, and defining apertures 184 constituting discharge ports.

A piston rod 187 carries a head 188 fixed thereto, and also a head 192 that is slidably mounted thereon. A yieldable washer 193, secured against one face of the head 188, is adapted to bear against a ring seat 197 fixed to the cylinder 176. A helical spring 201 surrounds the rod 187, tending to push the heads away from each other. Another spring 202 extends between the spider 177 and the head 188, tending to push the latter away from the stationary seat 197.

A bleeder valve 203 comprises a tubular body 206 secured to the cylinder 176, communicating therewith between the head 192 and seat 197, the body 206 having side ports 207. A needle valve screw 208, locked in adjusted position in the body 206 by a nut 209, partially closes an opening 210 into the bleeder valve, to determine the amount of water bleeding or escaping from the cylinder through the side ports 207.

When water under pressure is admitted to the cylinder 176, through the tube 181 and the coil 227 to be described, the piston head 192 is moved to substantially the dotted line position (Fig. 13) in which water is admitted freely through the tube 91, in back of the diaphragm, to push or expand the same upwardly in the tub. Movement of the head 192 also presses the head 188 against the seat 197, through the spring 201.

As the clothes are compressed between the diaphragm and the screen 133, the wash or rinse water escapes as above described. Near the end of the drying operation, the pressure behind the diaphragm builds up to that of the incoming fluid, which pressure occurs against the head 188 holding the latter tightly against the seat 197. As the pressure increases, and because the pressure of the incoming water is constant, the head 192 returns substantially to the full line position shown, in which position the flow of water into the diaphragm space reduces, entering merely through the space between the head 192 and the cylinder 176.

Whenever the water supply has been stopped by the automatic control mechanism 46, the bleeder valve 203 then allows the water pressure in the cylinder 176 to drop gradually. After a certain amount of bleeding, during which the water pressure drops sufficiently in a few seconds, the spring 202 overcomes the residual pressure against the head 188, and quickly moves the head 188 and the head 192 to the right, as viewed in Fig. 13, to the full open position for the head 188. Upon this action, the contraction of the diaphragm 33 forces the water through the opening in the ring seat 197 and through the discharge ports 184 of the spider 177 into the bottom of the housing 27, from which it drains through the drain pipe 62. The water pressure applied behind the diaphragm during expansion of the latter being substantially uniform, the pressures developed in the drying and flushing operations are readily calculable, so that the strength of the spring 202 can be properly chosen to effect the desired draining, quickly and in proper sequence.

The pressure maintained by the adjustable bleeder valve also enables regulating the duration of the period of high pressure on the clothes, that is to say, the rate of bleeding can be so adjusted as to determine the length of time before the piston 188 moves to open position to dump the water from behind the diaphragm and, therefore, there may be a period of sustained higher pressure during the drying operation.

The water supply to the valve 36 is from an inlet pipe 211 (Fig. 2), secured to the disc 56 by a clip 212, through a conduit 216 (Fig. 1), that extends through an opening in the shell 57, and through a connector 218 to a valve 221 of the control mechanism 46. From the valve 221, the water is conducted upwardly, through a connector 222, and downwardly through the conduit 181, which extends through an opening in the shell 57. After entering the shell 57, the conduit 181 extends upwardly through a nipple 226 in the bottom wall of the housing 27, and is formed into a flat spiral section 227 of about two turns surrounding the drive shaft 87, before continuing to the valve 36. The turns of the spiral are arranged of relatively large diameter and to radially contract and expand so that the tub may oscillate without danger of harm to the fluid connections by reason of the relative movement between the tub carried valve 36 and the stationary nipple 226. Arranging the conduit section 227 in a flat spiral coil also allows the bottom of the tub to be spaced from the bottom of the housing by a minimum distance, whereby to conserve space at a place where such conservation is of importance in a selection of height for the housing 27. The construction, arrangement and connections of the coil or spiral section 227 is claimed in my co-pending application Serial No. 651,498, filed March 2, 1946.

Special provisions are made to insure complete draining of the water from in back of the diaphragm 33, and to insure against accidental and premature closing of the opening to the diaphragm valve. To this end, the lower face of the base 84 of the lower agitator has an annular groove 228, Fig. 22, leaving a peripheral portion 229. The head of the mounting bushing 89 for the diaphragm valve 36 is received in the groove 228. The base 84 has numerous apertures 234 therethrough communicating with the groove 228, and the peripheral portion 229 also has numerous apertures 232 also communicating with the groove 228. When water is admitted in back of the diaphragm it passes through the apertures 234 and 232 to readily start the diaphragm expansion. When the water is being expelled from in back of the diaphragm it readily drains through the many openings into the groove 228 and from thence to the tub housing 27, but without danger of the diaphragm fouling the opening into the diaphragm valve 36.

The construction and arrangement of the diaphragm, including the molding of the diaphragm to conform with the shape of the agitator, and the cooperating drain structures are claimed in my co-pending application Serial No. 651,496, filed March 2, 1946.

CONTROL MECHANISM

This mechanism 46, constituting the means, or center, from which the control of all automatic operations of the machine emanates, and by which certain steps may be adjusted individually and relative to other steps, is arranged in a convenient compact unit at the front of the machine. Referring to Figs. 1, 6 and 8 to 12 inclusive, the mechanism is mounted in a housing supported by tubes 296 and 297 secured to the bottom part of the shell 57 and to the disc 56. The housing comprises a rear panel 301 and a thin sheet metal cover member 302, indicated in dot and dash lines in Fig. 1, of substantially crescent shape in horizontal section (Fig. 6) and having a top closure 303, portions of which are indicated in Figs. 6 and 8, the cover 302 being removably mounted on the standards 296 and 297.

The wash and rinse water valve 147 is mounted on a bracket 306 (Figs. 1 and 12) secured to the panel 301, and has an operating plunger 308. At its outer end, the plunger has a cam follower 311 for cooperation with a cam disc 312 having one cam lobe 313 thereon. The cam disc is motor operated, as will be described, to cause the cam to actuate the valve 147. The valve also may be operated by hand through lever 314, pivotally mounted at its inner end on the bracket 306 and having a pin and slot connection 318 with the follower 311. At its outer end the lever 314 is connected to one end of a wire cable 322 having at its other end, a member 336 which extends through slots 337 in the standard 297, to a handle 338. The handle has a cam-like portion 341. The position of the handle 338 indicated corresponds to the "off" or closed position of the valve 147, which, however, by reason of the flexibility of the cable 322 does not interfere with movements of the plunger 308 between its open and closed positions by the action of cam lobe 313. The plunger 308 is biased to its indicated outer or closed position by a spring (not shown) in the valve. However, lifting of the handle by hand will open the valve against the action of its spring. A sheet metal member 343, secured to the valve 147, carries a guide 346 for the cable 322.

The diaphragm water valve 221 (Fig. 11) is mounted on a bracket 347 which is secured to the panel 301. An operating plunger 351 for the valve, which is also biased to its outer position corresponding to the "closed" position of the valve by a spring (not shown), has at its outer end a cam follower 352 for cooperation with a cam disc 353 having two cam lobes 354 and 355 thereon. A lever 356, pivotally mounted at its inner end on the bracket 347, has a pin and slot connection 361 with the follower 352, and at its outer end, is connected to one end of a cable 362. The latter is connected, at its other end to a member 366 which extends through slots 367 in the standard 296 and is pivotally connected to a cam-like portion of a handle 368. As in the case of the handle 338, the position of the handle 368 indicated in Fig. 1 corresponds to the "off" or closed position of the valve 221 which however, by the flexibility of the cable 362, does not interfere with the movements of the plunger 351 between its open and closed positions by the cam lobes 354 and 355. Lifting of the handle opens valve 221 by hand when desired. A sheet metal member 376, secured to the valve 221, carries a guide 378 for the cable 362.

Figure 15:
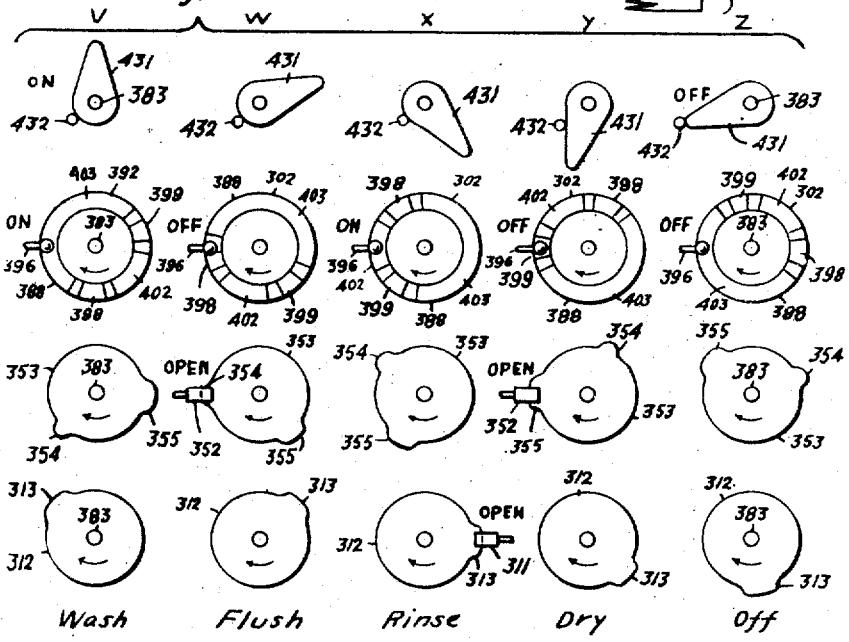
Fig. 15 is a diagram illustrating the sequence of operation of the cams of the control device of Fig. 8.

The cam discs 312 and 353 are secured, as by set screws 381 and 382 (Fig. 8) respectively, to a motor driven shaft 383 that is journaled in upper and lower bearing brackets 385 and 386 that are secured to the panel 301. Above the cam disc 353 a cam block 388 is also secured to the shaft 383, as by a set screw 391, this block as seen in Figs. 1, 8 and 10, having a continuous cam groove 392 in the face thereof. A ball end of a switch handle 396 rides in the groove 392 as the cam block is rotated. The groove is arranged with high spots and low spots to cause up and down movements, respectively, of the switch between the "off" and "on" positions thereof, as the cam is rotated. As indicated in Figs. 10 and 15, the cam groove 392 has two high or "switch off" portions 398 and 399, and two interspersed low or "switch on" portions 402 and 403. Thus, as the cam 388 is rotated, the switch handle 396 is moved back and forth between its "on" and "off" positions according to the sequence in which it is desired to have it do so.

Figure 14:
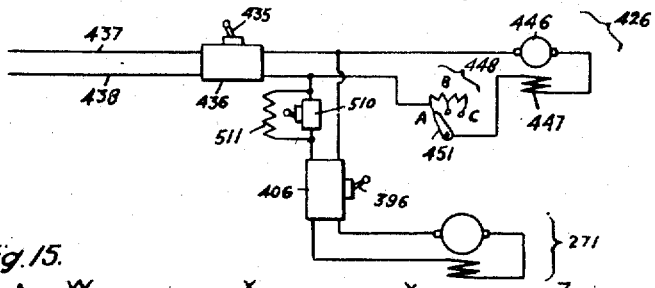
Fig. 14 is a diagram of electrical circuits and parts thereof employed in the machine.

Movement of the handle 396 controls operation of an electric switch 406 which is mounted on the panel 301 by a bracket 407. As indicated in Fig. 14, this switch controls the immediate energizing circuit of the tub operating or agitator motor 271. The remainder of the electric circuits will be described later.

Reverting to Figs. 1 and 8, the shaft 383 is driven by a worm wheel 411 through a special clutch mechanism housed in cylindrical block 412.

Clutch block 412 is secured to the top of the cam block 388 by dowel pins 413. A cup like recess 414 in block 412 houses clutch ring 415, see also Fig. 23 that is integral with or fixed to the underside of worm wheel 411. The interior of the ring is provided with a large number of fine teeth and has cooperating therewith vertically slidable clutch element 416, which is mounted on a plurality of reciprocable plunger rods 417. The rods are journaled in the block 412 and biased upwardly by springs 418 surrounding the plunger rods 417. The movable clutch member 416, the outer edge of which is serrated to engage with the teeth of the ring 415, surrounds the shaft 383. The upper portion of the shaft is tubular and has a vertical slot 419 in the portion within the cup recess 414. A projection 421 on the movable clutch member 416 extends through the slot 419 and is engaged by the lower end of a rod 422 in the tubular portion of shaft 383. The rod 422 extends upwardly to an operating knob or button 423 fixed thereto, and is normally biased upwardly by a helical spring 424 that is located in a cup like recess in the upper end of shaft 383. Normally the clutch elements 415 and 416 are engaged and the shaft 383 is positively driven. At times, as will be explained in the operation, it becomes desirable to rotate the shaft independently of the gear drive. At such times the knob 423 is depressed to cause the rod 422 to disengage the clutch members, at which time the shaft can be turned by the hand knob 425 that is mounted at the upper end thereof.

The drive for the worm wheel 411 is from a motor 426 (Figs. 1 and 6), mounted by casing 427 on the panel 301, through a worm gear 428 on the shaft of the motor and which meshes with the worm wheel 411.

The collar 429 of the worm wheel 411 abuts the upper bearing 385. Above this bearing the shaft also has secured thereto another cam 431 (Figs. 8 and 9) which engages a depending pin 432 carried at one end of a slide 433. The opposite end of the slide has a depending cup 434 in which is received the ball end of a switch lever 435 which is part of a switch 436. As seen from Fig. 14, this switch controls the main input power circuit 431, 438, which extends directly to the cam motor 426, and the switch is also in series circuit relation to the agitator motor switch 406. In the position shown in Fig. 8, the switch lever 435 is in "on" position with the circuit completed therethrough. As the pin 432 rides over the high point of the cam the slide and switch handle are moved to the "off" position with the power circuit to both motors interrupted. As will be explained, this occurs only after the automatic cycle of operations of the machine is completed. The switch handle is moved to "on" position by hand by means of knob 439 that is mounted on the horizontal portion of a lever 441. This lever is connected to a slide 442 which in turn is connected to slide 433 by a flat connector 443. This connector works in a slot 444 in the upper wall 363 of the housing for the automatic mechanism. It should be noted that the slide 433 is guided by its bifurcated end 445 which straddles shaft 383.

It is desirable that the knob 423 shall not be depressed to allow the shaft 383 to be rotated by hand, as has been described, while either or both of the motors are energized. To prevent this, the horizontal extension 446 of the hand lever 441 is arranged to project beneath the knob 423 whenever the switch handle 435 is in the "on" position, but to be moved clear thereof when that handle is in the "off" position or left hand position.

It is proposed to arrange the control so as to enable the user to compensate for variations of supply water pressure and flow available. Obviously, if the speed of the motor 426 is varied, the speed of the cam shaft 383 of the control mechanism will be varied and the cams will take more or less time to perform their respective offices. Accordingly, as seen in Fig. 14, the motor 426 comprises an armature 446 and a field winding 447 connected in series with the conductors 437 and 438 through a variable resistor 448, shown in Figs. 1 and 6 as mounted on the panel 301, and having in this instance, three taps A, B and C, with which a movable contact arm or knob 451 cooperates for varying the resistance of the motor circuit. The point A corresponds to high speed or high water pressure, the point B to speed and pressure of intermediate value or degree, and the point C to low speed and pressure, as will be apparent. That is to say, if the water pressure or flow is lower than a normal standard, it will require longer for all operations which depend upon the incoming water such as flushing, rinsing and drying. By properly choosing the speed of the cam shaft motor 426 this increased time can be provided for without disturbing the automatic cycle of the control mechanism and machine functions.

The adjustments of the machine indicated somewhat in the above description are not operations which must be effected at the beginning of each washing, but in the main are adjustments which once made will remain so long as the machine remains in the locality of one general water supply pressure and flow. If however, the pressure in a locality varies, the adjustments are available to compensate therefor.

Figure 19:
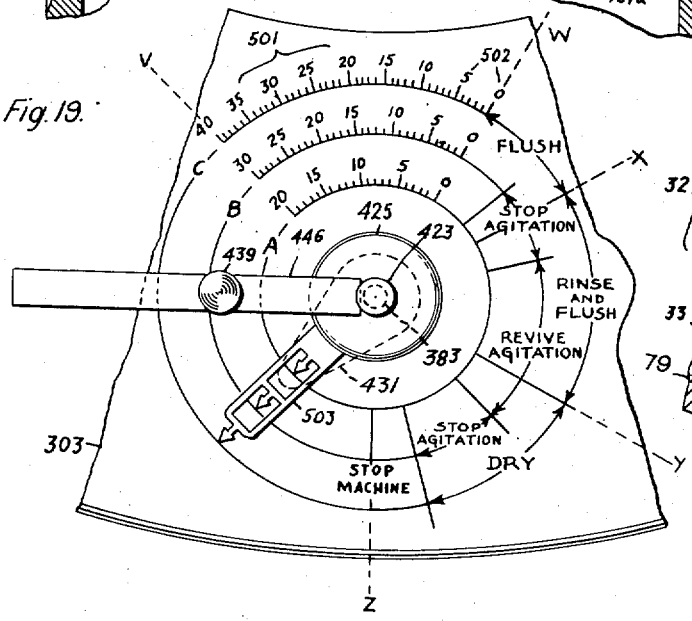
Fig. 19 is a fragmentary top plan view of a form of control dial.

Fig. 19 illustrates a form of index device for the guidance of the user. The dial 501 is provided with markings 502 denoting minutes of washing periods which in conjunction with legends indicating the other operations of the machine enable the user to control the same and to know the condition of operation thereof. The dial 501 is provided with three scales A, B and C, corresponding to the positions A, B and C of the rheostat 448, and the movable index pointer 503 is provided with three arrows to cooperate respectively with the scales A, B, and C, for the different motor speeds, or by translation, different water pressures.

OPERATION

At the beginning of the operation of the machine the user places in the tub the dry clothes. The machine is then filled with water by hand operation of the handle 338 (Fig. 1) to open the water supply valve 147. When the machine is thus filled to the proper level, the handle 338 is returned to the position shown in Fig. 1 which permits the water valve to close and the follower 311 to return to engagement with the cam disc 312. Soap, washing powder or water softener is then added and the lid 111 is locked in place.

Assuming that the water pressure is normal, the operator will use scale A, and assuming that a twenty minute washing period is desired, the button 423 is depressed, before the main switch is turned on, and the cam shaft 383 is turned by the knob 425, to bring the pointer 503 to the figure 20 on scale A. This operation has adjusted the several cams on the shaft 383 to approximately the position shown in column V (left hand) of Fig. 15. It will be noted that the agitator cam 388 has moved the switch handle 396 to the "on" position so that the circuit to the agitator motor 271 is closed. However, no current is supplied to this motor as yet because the main line switch 436 has not been closed.

After releasing the button 423 the operator closes the main line switch 436 by moving the knob 439, and its associated lever and slides, to the right in Fig. 8. This operation energizes both the agitator motor and the cam shaft motor as will be understood from Fig. 14. The same operation also moves the end of the lever 441 beneath the button 423 so that the latter cannot be depressed and the cams cannot be adjusted further by hand while the motors are energized. With the energization of the agitator motor, tub oscillation commences to perform the washing of the clothes.

At the end of the selected twenty minute washing period the cam shaft has advanced the cam disc 353 substantially to the position shown in column W of Fig. 15, in which position the cam lobe 354 has actuated the follower 352 to open the valve 221 to admit water in back of the diaphragm 33, through the valve 36. This is the beginning of the flushing operation in this case, in which the diaphragm lifts the clothes and wash water toward the top of the machine so that the wash water is gradually forced out through the drain openings 134 (in the lid) and 106 (in the tub). Thus, any scum and matter which has accumulated on top of the water is flushed out of the machine. It will be noted that the agitation of the machine has not stopped and does not stop until the diaphragm has lifted the clothes and water past the center of the tub, which is about one-half or two-thirds of the flushing cycle, the agitation being continued by means of the upper baffles, whereby the accumulated matter is liberated from the clothes to float off with the water.

At the desired point in the flushing operation, the cam 388 reaches the position shown in column W of Fig. 15, where the handle 396 of the agitator motor switch is moved to the "off" position, and agitation ceases, but the inflation of the diaphragm continues, as does the operation of the cam shaft motor. The expansion of the diaphragm to remove the wash water is continued until substantially all of the water has been extracted from the clothes at which time the cam lobe 354 has passed the follower 352 and the diaphragm water valve 221 closes. Under the action of the bleeder valve 203 as heretofore explained, the valve 36 operates to empty the water from behind the diaphragm, and the diaphragm returns to its lower position shown in Fig. 2.

By this time, the cam disc 312 has advanced substantially to the position shown in the column X of Fig. 15 to actuate the follower 311 of the water valve 147 to again open the same to admit water to the tub through the center of the lid as heretofore explained. This is the beginning of the rinsing operation. When sufficient water has been admitted to the tub to make agitation of the clothes and water of some benefit, which is about one-third of the time consumed by the rinsing operation, the agitator cam disc 388 has reached the position shown in column X of Fig. 15, to again operate the agitator motor switch to energize the agitator motor. Agitation continues during the remainder of the rinsing operation, and the valve 147 is held open a sufficient length of time for the tub to completely fill with water and also to overflow through the ducts 134 and 166 for a sufficient interval to thoroughly rinse the clothes.

At the conclusion of the rinsing operation, the cam lobe 313 of disc 312 has passed beyond the follower 311, as indicated in column Y of Fig. 15 and the cam lobe 355 of the disc 353 has moved to the position to again open the diaphragm water valve 221, as shown in the same column.

This will again expand the diaphragm to eject the rinse water and is the beginning of the drying operation. Agitation is still continued and agitator cam 388 does not again actuate the switch arm 396 to stop the agitation motor until the diaphragm is above the center of the tub and preferably about half of the period of time for this particular operation of the diaphragm. At this time the agitator cam 388 has reached the "off" position shown in column Y of Fig. 15. The expansion of the diaphragm continues to bring about drying of the clothes by compressing the same against the upper portions of the tub and its cover, until all of the water is extracted from the clothes whereupon the supply of water behind the diaphragm is shut off by the cam lobe 355 riding past the follower of the valve 221. Then the action of the bleeder valve 203 and diaphragm valve 36 will again operate to dump the water from in back of the diaphragm.

All of the time that this whole cycle of operations has been going on the cam 431 has been turning, and has been gradually moving the pin 432 of slide 433 to the left in Fig. 8. By the time the diaphragm water has been removed from the machine and the diaphragm has returned to its lower position, the pin 432 is at the high point of the cam 431, as shown in column Z of Fig. 15, so that the slide 433 has moved the switch arm 435 to the left in Fig. 8 to interrupt the main power line circuit to the cam motor and also to the agitator motor. In this position, in which the various cams have the position shown in column Z of Fig. 15, the machine is entirely stopped, whereupon the operator removes the lid from the machine and takes out the washed and dried clothes.

Should the water pressure be less than the selected high or normal pressure, the rheostat 446 will be adjusted to position B or position C as the case may be, and the operator of the machine then fixes the washing period by using either the scale B or the scale C of dial 501, whereupon the entire sequence of operations as above described will be performed automatically, but at slower rates because of the slower operation of the cam shaft 383. Thus, sufficient time is provided for the water to raise the diaphragm to its full extent for the flushing and drying operations and for the rinse water to fill the machine and overflow as above described notwithstanding its lower pressure and therefore its slower rate of flow.

Of course, if the operator desires a washing period of less than twenty minutes the cam shaft 383 is turned to bring the pointer 503 to the particular point on the scale for the washing period desired, for example, 5, 10 or 15 minutes, and at the expiration of the selected period of time, the remainder of the functions of the machine will be performed automatically as described above.

While in the above description there is no further operation of the agitator motor after it is stopped during the middle of the drying operation, it will be understood that by the simple addition of another lobe on the cam block 388, the tub could be oscillated for a brief interval near or at the conclusion of the drying operation to loosen the clothes prior to their removal from the machine.

It should be pointed out that in the event the operator of the machine desires to soak the clothes overnight or before beginning the washing and drying operations, the machine would be filled with wash water, clothes, etc., as above described, but the knob 439 controlling the main line switch would not be moved to the right in Fig. 8. When it is desired to begin the washing operation, and to do so with fresh, heated water, the operator will actuate valve 221 either by operation of hand lever 356 or by depressing the knob 423, and turning the cam shaft until the pointer 503 indicates the beginning of the drying operation. At this time the several cams will be substantially in the position shown in column Y in Fig. 15. The operator will then close the main line switch 436 which will start the operation of the machine and of the cam motor to expand the diaphragm to remove the water in which the clothes have been soaking. At the completion of this operation, the diaphragm will have returned to its lower position, and the machine stopped, whereupon the operator will fill the tub with fresh water and add washing compound, etc., just as described above for the beginning of the washing operation, and will then condition the machine for the automatic control of its several functions.

A reference to hand operation of the water filling arrangement and for putting in washing compound does not preclude the possibility of also performing these functions automatically if desired.

The user of the machine may wish to wash certain articles requiring less forceful agitation of the clothes. For this purpose the circuit of the agitator motor 271 includes a switch 510 (Fig. 14) which is normally in closed position. When slower speed of the motor is desired the switch is operated to insert the resistor 511 in the motor circuit.

It will be noted from the dial in Fig. 19 that the flushing period is indicated as of less duration than the drying operation, but it will be understood that these periods may be of equal duration.

Also, the foregoing description contemplates obtaining flushing action by operation of the diaphragm, but this is not necessary. Flushing may be accomplished without diaphragm movement by lengthening the cam lobe for longer opening of the valve 147 for the rinsing operation. Of course, lobe 354 would be omitted. In this operation agitation would not stop and the incoming water stream at the center of the tub would cause overflowing and draining of scum, etc. from the tub along the sides thereof. Various methods of washing, related to the above disclosure, are claimed in my co-pending application Serial No. 651,495, filed March 2, 1946, *now abandoned.*

MODIFIED SCREEN STRUCTURE

Figure 17:
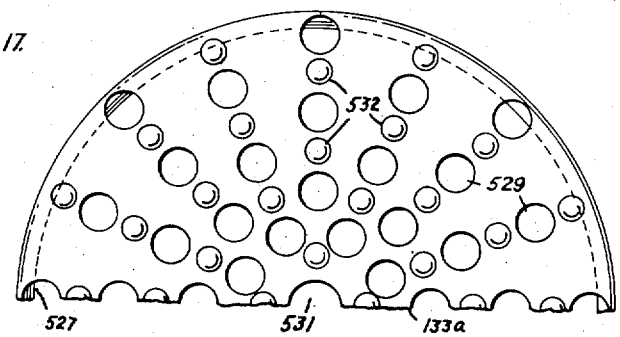
Fig. 17 is a top plan view showing a modified form of screen for position in the structure in the place of the screen of Fig. 16.
Figure 18:
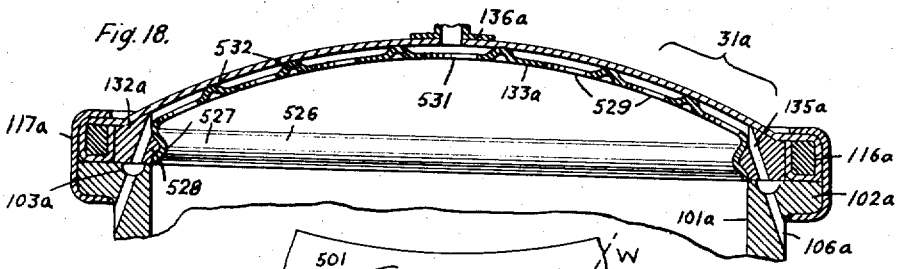
Fig. 18 is a view, on a slightly enlarged scale, similar to the top of Fig. 2, showing the modified screen of Fig. 17 and its mounting.

As shown in Figs. 17 and 18, in which corresponding parts are designated by corresponding reference numerals having the subscripts (a), and new parts are designated by numerals alone, a modified form of the screen 133, in the lid of the machine, comprises a screen 133a, which, instead of being constituted of wire mesh, as in the case of the screen 133, is constructed of sheet metal, such as stainless steel. It has the same general inverted shallow substantially dish shape, but instead of requiring the removal of screws or other parts for its removal and cleaning, screen 133a is provided with a depending peripheral portion 526 having a bead 527 which interlocks with a bead 528 on ring 132a of the lid. Thus, the screen is adapted to be moved into position and removed with a substantially snap action. The ring 132a has apertures 135a communicating with a groove 103a in the top surface of the tub neck portion 101a, which is further provided with ducts 106a. A bail member 117a embraces flanges 116a and 102a, to hold the lid in place, as hereinabove described. Apertures 529 in the screen 133a take the place of the openings in the wire screen mesh above set forth, and a central aperture 531 is provided in register with the inlet nipple 136a. Raised portions 532 serve to maintain the screen 133a spaced from the lid body 111.

Other modifications may be made in the shape, arrangement and location of parts within the spirit and scope of my invention, and such modifications are intended to be covered by the appended claims.

I claim:

1. In a washing machine, a tub, means for agitating clothes in the tub, a means for flushing and drying the clothes, means for rinsing the clothes, and actuating and control mechanism for automatically (a) operating said flushing and drying means to start the flushing of the clothes while said agitating means is operating, (b) stopping the agitating means while continuing the action of the flushing, (c) stopping the flushing means, (d) starting the rinsing means, (e) reviving operation of the agitating means, (f) stopping the rinsing means, and (g) starting the operation of the flushing and drying means to dry the clothes during the revived action of the agitating means, and (h) stopping the agitating means before the end of the drying operation of the drying means.

2. In a washing machine, agitating means including an electric motor, a switch for controlling said motor, control mechanism including a cam shaft and a cam on the shaft for controlling said switch, a motor for operating said cam shaft, means including a clutch between said cam shaft and its motor for adjusting the cam shaft relative to the motor, a second switch in circuit with said motors, and interlock means between said second switch and said adjusting means requiring said switch to be open for the manipulation of said clutch.

3. In a clothes washing machine, a plurality of operating means including means for washing the clothes, means for flushing the wash water from the clothes, means for rinsing the clothes, and means including said flushing means for drying the clothes, control means to cause said washing, flushing, rinsing and drying to occur in succession automatically, and means for manually operating one of said plurality of operating means independently of the automatic control means.

4. In a clothes washing machine, a plurality of operating means including means for washing the clothes, means for flushing the wash water from the clothes, means for rinsing the clothes, and means including said flushing means for drying the clothes, control means to cause said washing, flushing, rinsing and drying to occur in succession automatically, and means for selectively manually operating the drying means independently of the automatic control means.

5. In a washing machine, clothes agitating means, means including an electric motor for actuating said agitating means, control mechanism, means including an electric motor for actuating said control mechanism, a main switch connected in circuit directly with said control motor and through another switch to said agitating motor, and means as part of said control mechanism for controlling said switches including means for selectively operating one of the switches independently of the other.

6. In a washing machine, clothes agitating means, means including an electric motor for actuating said agitating means, control mechanism, means including an electric motor for actuating said control mechanism, a variable impedance device connected in circuit to said control motor, a main switch connected in circuit directly to said control motor and through another switch to said agitating motor, and means in said control mechanism for controlling said switches including means for selectively manually operating said other switch.

7. In a washing machine, a tub, a drain outlet at the top of the tub, means for agitating clothes in the tub, a flexible diaphragm positioned in the lower portion of the tub, means for admitting water to the tub for rinsing the clothes, and actuating and control mechanism for controlling the agitating means, for partially expanding the diaphragm to remove part of the wash water, for admitting the rinse water and for thereafter further expanding the diaphragm sufficiently to dry the clothes.

8. In a washing machine, a tub, means for agitating clothes in the tub, a water inlet to the tub, a drain for the tub, a flexible diaphragm mounted in the tub, a valve controlled inlet for admitting fluid behind said diaphragm to cause the same to contract the space occupied by the clothes in the tub, and control mechanism for the agitating means, the water inlet and the fluid valve, so constructed and arranged as to admit fluid behind the diaphragm to cause the same to partially contract the space occupied by the clothes in the tub, to thereafter admit rinsing water to the tub, and to thereafter admit additional fluid behind the diaphragm so as to compress the clothes to dry the same.

9. In a washing machine, a tub, a drain outlet for the tub, means for agitating clothes in the tub, a flexible diaphragm mounted in the tub, means for admitting water to the tub for rinsing the clothes, and actuating and control mechanism for controlling the agitating means, for partially expanding the diaphragm to remove part of the wash water, for admitting the rinse water while the diaphragm is partially expanded and for thereafter further expanding the diaphragm so as to compress the clothes to dry the same.

10. In a clothes washing machine, a plurality of operating means including means for supplying wash water to the tub, means for washing the clothes, means for flushing the wash water from the clothes, means for rinsing the clothes, and means including said flushing means for drying the clothes, control means to cause said washing, flushing, rinsing and drying to occur in succession automatically, and means for manually operating one of said plurality of operating means independently of the automatic control means.

*11. In a washing machine, a tub; means for admitting water to the tub for washing articles and for rinsing the articles being washed, the washing and the rinsing being respectively carried out in the presence of a free body of liquid maintained in the tub; means for agitating the articles and water in the tub during washing, flushing and rinsing operations; a drain outlet for the tub located above the level of the washing water in the tub; a flexible diaphragm normally occupying a position of rest in the tub; and actuating and control mechanism for controlling the agitating means, for expanding the diapragm to flush wash water from the tub, for admitting rinse water, and for thereafter re-expanding the diaphragm sufficiently to dry the articles.*

*12. In a washing machine, a tub; means for admitting water to the tub for washing articles and for rinsing the articles being washed, the washing and the rinsing being respectively carried out in the presence of a free body of liquid maintained in the tub; a drain outlet for the tub located above the level of the washing water in the tub; a flexible diaphragm normally occupying a position of rest in the lower portion of the tub; actuating and control mechanism for controlling agitating means, for expanding the diaphragm to flush and remove wash water from the tub, for admitting rinse water, and for thereafter re-expanding the diaphragm sufficiently to dry the articles; and means for agitating the articles and water in the tub in the course of the washing and rinsing operations and the diaphragm expansion and re-expansion.*

*13. In a washing machine, a tub; means for admitting water to the tub for washing articles and for rinsing the articles being washed, the washing and the rinsing being respectively carried out in the presence of a free body of liquid maintained in the tub; means for agitating the articles and water in the tub during washing, flushing and rinsing operations; a drain outlet for the tub located above the level of the washing water in the tub; a flexible diaphragm normally occupying a position of rest in the tub; actuating and control mechanism for controlling the agitating means, for expanding the diaphragm to flush and remove wash water from the tub, for admitting rinse water to the tub in such quantity as to cause it to overflow the tub, and for thereafter re-expanding the diaphragm to flush rinse water from the tub and sufficiently to dry the articles.*

*14. In a washing machine, a tub; means for admitting water to the tub for washing articles and for rinsing the articles being washed, the washing and the rinsing being respectively carried out in the presence of a free body of liquid maintained in the tub; a drain outlet in the upper part of the tub; a diaphragm normally occupying a position of rest in the lower portion of the tub; actuating and control mechanism for controlling agitating means, for raising the diaphragm to flush and remove wash water from the tub, for admitting rinse water to the tub in such quantity as to cause it to overflow the tub, and for again raising the diaphragm sufficiently to dry the articles; and means for agitating the articles and water in the tub in the course of the washing, rinsing and diaphragm raising operations.*

*15. In a washing machine, a tub, means for admitting water to the tub for washing and also for rinsing articles in the tub, a drain outlet in the top of the tub, means for agitating the articles and water in the tub, a flexible diaphragm mounted in and normally occupying a contracted position in the tub, means for expanding the diaphragm to discharge wash water and also rinse water through said outlet, the diaphragm returning to its contracted position after being expanded, and actuating and control mechanisms for operating the agitating means in the course of said washing and rinsing and diaphragm operations, for expanding the diaphragm to remove substantially all of the wash water, for admitting rinse water as the diaphragm contracts, and for thereafter expanding the diaphragm so as to compress the articles to dry the same.*

*16. In a washing machine, an oscillatable tub, means for admitting water to the tub for washing and also for rinsing articles in the tub, a drain outlet in the upper part of the tub, means in the tub for agitating the articles and water as the tub oscillates, a flexible diaphragm mounted in and normally occupying a contracted position in the lower portion of the tub, means for raising the diaphragm to discharge wash water and also rinse water through said outlet, the diaphragm returning to its contracted position after being expanded, and actuating and control mechanism for oscillating said tub in the course of said washing and rinsing and diaphragm operations, for raising the diaphragm to remove substantially all of the wash water, for admitting rinse water as the diaphragm contracts, and for thereafter raising the diaphragm so as to compress the articles to dry the same.*

*17. In a washing machine, a substantially* spherical tub, means for admitting water to the tub for washing and also for rinsing articles in the tub, a drain outlet in the upper part of the tub, means for agitating the articles and water in the tub including means for oscillating the tub and baffle means effective in the upper and lower portions of the tub, a flexible diaphragm mounted in and normally occupying a contracted position in the tub, means for expanding the diaphragm to discharge wash water and also rinse water through said outlet, the diaphragm returning to its contracted position after being expanded, and actuating and control mechanism for oscillating said tub in the course of said washing and rinsing and diaphragm operations, for expanding the diaphragm to remove substantially all of the wash water, for admitting rinse water as the diaphragm contracts and in a quantity sufficient to cause and continue an overflow of water as said agitation continues, and for thereafter expanding the diaphragm so as to compress the articles to dry the same.

18. In a washing machine, a tub, means for admitting water to the tub for washing and also for rinsing articles in the tub, a drain outlet in the upper part of the tub, means for agitating the articles and water in the tub, a flexible diaphragm mounted in and normally occupying a contracted position in the tub, means for expanding the diaphragm to discharge wash water and also rinse water through said outlet, the diaphragm returning to its contracted position after being expanded, and actuating and automatically operating control mechanism for operating the agitating means in the course of said washing and rinsing and diaphragm operations, for expanding the diaphragm to remove substantially all of the wash water after a predetermined washing period, for admitting rinse water as the diaphragm contracts and thereafter in sufficient quantity to overflow the tub as the rinsing progresses for a predetermined period, and for thereafter expanding the diaphragm so as to compress the articles to dry the same.

19. In a washing machine, a tub, a water inlet to the tub, means for admitting water to wash clothes and also to rinse clothes in the tub, means for agitating clothes and water in the tub, a water outlet in the upper part of the tub, a hydraulically operated member mounted in the tub, a valve controlled inlet for admitting fluid under pressure to cause said member to contract the space occupied by the clothes in the tub, and control mechanism for the agitating means, the water means and the fluid valve, so constructed and arranged as to admit fluid to cause said member to contract the space occupied by the clothes in the tub so as to discharge wash water from the tub and to thereafter compress the clothes against the tub adjacent the water outlet to remove substantially all the wash water therefrom, to thereafter admit rinsing water to the tub, and to thereafter admit fluid to cause said member to contract the space occupied by the clothes in the tub so as to remove the rinse water and to compress the clothes to dry the same, and actuating mechanism operating said agitating means during the washing and rinsing and the contracting operations of said member.

20. In a washing machine, a tub, a water inlet to the tub, means for admitting water to wash clothes and also to rinse clothes in the tub, means for agitating clothes and water in the tub, a water outlet in the upper part of the tub, a hydraulically operated member mounted in the tub, a valve controlled inlet for admitting fluid under pressure to cause said member to contract the space occupied by the clothes in the tub, and control mechanism for the agitating means, the water means and the fluid valve, so constructed and arranged as to admit fluid to cause said member to contract the space occupied by the clothes in the tub so as to discharge wash water from the tub and to thereafter compress the clothes against the tub adjacent the water outlet to remove substantially all the wash water therefrom, to thereafter admit rinsing water to the tub in such quantity as to cause it to overflow from the tub, and to thereafter admit fluid to cause said member to contract the space occupied by the clothes in the tub so as to remove the rinse water and to compress the clothes to dry the same, said control mechanism including means for holding the clothes under the higher compression pressures for a sustained period and for thereafter releasing said pressure fluid, and actuating mechanism operating said agitating means during the washing and rinsing and the contracting operations of said member.

21. In a washing machine, a tub, a water inlet in the upper part of the tub, means for admitting water to wash clothes and also to rinse clothes in the tub, means for agitating clothes and water in the tub, a water outlet in the upper part of the tub, a diaphragm mounted in the tub, a valve controlled inlet for admitting fluid under pressure behind said diaphragm to cause the same to contract the space occupied by the clothes in the tub, control mechanism for the water means and the fluid valve, so constructed and arranged as to admit fluid behind the diaphragm to cause the same to contract the space occupied by the clothes in the tub so as to discharge wash water from the tub and to thereafter compress the clothes against the tub adjacent the water outlet to remove substantially all the wash water therefrom, to thereafter admit rinsing water to the tub in such quantity as to cause it to overflow from the tub during the rinsing operation, and to thereafter admit fluid behind the diaphragm to cause the same to contract the space occupied by the clothes in the tub so as to remove rinse water and to compress the clothes to dry the same.

22. In a washing machine, a substantially spherical tub, agitating means mounted in the tub, a water inlet in the upper part of the tub, means for admitting water to wash clothes and also to rinse clothes in the tub, means for oscillating the tub to agitate clothes and water in the tub, a water outlet in the upper part of the tub, a flexible diaphragm mounted in the lower portion of the tub, a valve controlled inlet for admitting fluid under pressure behind said diaphragm to raise the same in the tub, and automatic sequential control mechanism for the agitating means, the water means and the fluid valve so constructed and arranged as to admit fluid behind the diaphragm to raise the same so as to discharge wash water from the tub and to thereafter compress the clothes against the tub adjacent the water outlet to remove substantially all the wash water therefrom, to thereafter admit rinsing water to the tub in such quantity as to cause it to overflow from the tub during the rinsing operation, to stop the flow of rinse water, and to thereafter admit fluid behind the diaphragm to raise the same so as to remove the rinse water and to compress the clothes to dry the same, the tub being oscillated to render the agitating means effective during the washing and rinsing operations and as the diaphragm is being raised, and the control mechanism stopping the oscillation of the tub subsequent to the removal of the rinse water.

23. In a washing machine, a substantially spherical tub, agitating means mounted in the tub, a water inlet in the upper part of the tub, means for admitting water to wash clothes and also to rinse clothes in the tub, means for oscillating the tub to agitate clothes and water in the tub, a water outlet in the upper part of the tub, a flexible diaphragm mounted in the lower portion of the tub, a valve controlled inlet for admitting fluid under pressure behind said diaphragm to raise the same in the tub, and automatic sequential control mechanism for the agitating means, the water means and the fluid valve so constructed and arranged as to admit fluid behind the diaphragm to raise the same so as to discharge wash water from the tub and to thereafter compress the clothes against the tub adjacent the water outlet to remove substantially all the wash water therefrom, to thereafter admit rinsing water to the tub in such quantity as to cause it to overflow from the tub during the rinsing operation, to stop the flow of rinse water, and to thereafter admit fluid behind the diaphragm to raise the same so as to remove the rinse water and to compress the clothes to dry the same, the tub being oscillated to render the agitating means effective during the washing and rinsing operations and as the diaphragm is being raised, and the control mechanism including means for holding the clothes under the higher compression pressures for a sustained period and for thereafter automatically releasing said pressure fluid, and stopping the oscillation of the tub subsequent to the removal of the rinse water.

24. In a washing machine, a tub, means for admitting water to the tub for washing and for rinsing the clothes, a water outlet in the upper part of the tub, means for agitating clothes and water in the tub, a means for flushing and compressing the clothes to remove the water from the clothes, and actuating and control mechanism for subsequently operating said flushing and drying means to cause flushing while said agitation continues and continuing the action of the flushing and drying means to remove wash water from the clothes, stopping the action of the flushing and drying means, starting the admission of rinse water, reviving agitation of the clothes, stopping the rinsing action, re-starting the operation of the flushing and drying means to remove rinse water while continuing agitation of the clothes and continuing such operation to dry the clothes, and stopping the agitating means.

25. A washing, rinsing and drying machine having, in combination, a tub with agitating means above and below the horizontal center line of the tub and an opening in the upper part of the tub for discharge of fluid from said opening during washing, rinsing and flushing operations, means supporting said tub for oscillation, means for oscillating said tub to agitate the materials and water in the tub during washing, rinsing and flushing operations, means for supplying washing fluid to the tub, means in said tub arranged to be moved so as to flush washing fluid from the tub through said opening and thereafter to be further moved for extracting fluid from the clothes and through said opening, means for supplying rinse fluid to the tub after said extraction, means for again moving said movable means to flush rinse fluid from the tub through said opening and to thereafter dry the clothes, and means to stop the machine.

26. A washing, rinsing and drying machine having, in combination, a tub with agitating means above and below the horizontal center line of the tub and an opening in the upper part of the tub for discharge of fluid from said opening during washing, rinsing and flushing operations, means supporting said tub for movement, means for moving said tub so as to agitate the materials and water in the tub during washing, rinsing and flushing operations, means for supplying washing fluid to the tub, means in said tub arranged to contract the space in the tub so as to flush washing fluid from the tub through said opening and to extract fluid from the clothes and through said opening, means for supplying rinse fluid to the tub after said extraction, means for again actuating the means to contract the space in the tub to flush rinse fluid from the tub through said opening and to thereafter dry the clothes, and means to stop the machine.

27. A washing, rinsing and extracting machine having in combination a tub adapted to contain clothes and a cleaning fluid and to agitate the clothes and fluid to perform a washing operation when the fluid is agitated and having a fluid discharge opening in the top thereof through which fluid is flushed, means for movably supporting said tub, means for moving said tub during washing and rinsing operations and during at least a part of the flushing operations following the washing and rinsing operations, means for supplying washing fluid to the tub, means for flushing washing fluid from the tub through said top opening and for then extracting washing fluid from the clothes through said top opening, means for supplying rinsing fluid to the tub upon completion of said extracting operation and in a quantity sufficient to cause an overflow through said opening while the clothes are agitated in the fluid by the movement of the tub to carry away foreign matter from said clothes, means for flushing rinsing fluid from the tub and for then extracting fluid from the clothes through said top opening to dry the clothes, and means for effecting sequential operation of the machine to obtain a cycle comprising washing, flushing, extracting, rinsing, flushing and drying in the order named.

28. A machine as defined in claim 27 wherein the means for flushing and extracting comprise, a flexible member having its peripheral edge fastened in fluid-tight relation with the tub so as to divide the tub into an upper washing compartment and a lower pressure chamber and normally operated to overlie the bottom portion of the container, the machine being provided with means to force the diaphragm upwardly to perform said flushing, extracting and drying operations.

29. A washing, rinsing and drying machine comprising a substantially spherical tub having an opening at the top of the tub whereby materials to be cleaned may be loaded in said tub, a cover for said opening arranged to allow the draining of water from said tub through said opening, baffle means mounted above and below the horizontal center line of the tub for causing agitation of clothes and water in the tub, means mounting the tub for oscillation about a vertical axis, driving means for oscillating said tub, means for suppyling wash and rinse water to said tub, a diaphragm shaped to conform somewhat to the lower portion of said tub and to normally overlie

*the lower baffle means, clamping means engaging the diaphragm for mounting the same adjacent the horizontal center line of the tub and for sealing the same against the leakage of fluid from one side to the other of said diaphragm, and actuating and control mechanism for oscillating said tub during washing, rinsing and at least a portion of the respective times occupied in raising said diaphragm, for admitting fluid behind said diaphragm for raising the same for the flushing of wash water from the tub through said top opening and for further raising the diaphragm to compress the materials to extract wash water from the clothes, for thereafter removing fluid from behind the diaphragm whereupon the diaphragm will return to its lower position, for admitting rinse water to the tub when said extraction is completed and in quantity sufficient to cause an overflow through said opening, for again admitting fluid behind said diaphragm for raising the same for the flushing of rinse water from said tub through said top opening and for further raising the diaphragm to compress the materials to dry the same, for thereafter removing fluid from behind the diaphragm whereupon the diaphragm will return to its lower position, and for stopping the machine after the late mentioned compressing operation.*

*30. A washing, rinsing and drying machine having, in combination, a tub with agitating means above and below the horizontal center line of the tub and an opening whereby materials to be cleaned may be loaded in said tub, a cover for said opening constructed and arranged to allow the discharge of fluid from said opening during washing, rinsing and flushing operations, means supporting said tub for oscillation, means for oscillating said tub to agitate the materials and water in the tub during washing, rinsing and flushing operations, means for supplying washing fluid to the tub, means movable in said tub so as to flush washing fluid from the tub through said opening and to extract washing fluid from the clothes and through said opening, means for supplying rinse fluid to the tub after said extraction and in quantity sufficient to cause an overflow through said opening, means for again moving said movable means to flush rinse fluid from the tub through said opening and to thereafter dry the clothes, and means to stop the machine.*

*31. In a washing machine, a tub, means for admitting water to the tub for washing and also for rinsing articles in the tub, the washing and the rinsing being respectively carried out in the presence of a free body of liquid maintained in the tub, a drain outlet for the tub located above the level of the washing water in the tub, means for agitating the articles and water in the tub, a flexible diaphragm mounted in and normally occuping a position along at least one wall of the tub, means for moving the diaphragm toward the center of the tub to discharge wash water and also rinse water through said outlet, and actuating and control mechanism for operating the agitating means in the course of the washing, rinsing and diaphragm operations, for moving the diaphragm to compress the articles to remove wash water from said articles, for admitting rinse water to the tub, and for thereafter moving the diaphragm so as to compress the articles to dry the same.*

*32. A washing, rinsing and extracting machine having, in combination, a tub adapted to contain clothes and a cleaning fluid, and to agitate the clothes and fluid to perform a washing operation when the fluid is agitated, and having a fluid discharge opening in the upper part thereof, means for movably supporting said tub, means for moving said tub during washing and rinsing operations and during at least a part of flushing operations respectively following the washing and rinsing operations, means for supplying washing fluid to the tub, a flexible member having its peripheral edge fastened in fluid tight relation with the tub and extending along the walls of the tub so as to divide the tub into a washing compartment and a pressure chamber, means to force the diaphragm from adjacent the walls to flush washing fluid from the tub through said opening and for extracting washing fluid from the clothes through said opening, means for supplying rinsing fluid to the tub upon completion of said extracting operation while the clothes are agitated in the rinsing fluid by the movement of the tub, and means to force the diaphragm from adjacent the walls to flush rinsing fluid from the tub through said opening and for extracting fluid from the clothes through said opening to dry the clothes.*

*33. In a washing machine, a tub, means for admitting water to wash clothes and also to rinse clothes in the tub, means for agitating clothes and water in the tub, a water outlet opening into the upper part of the tub, a diaphragm mounted in the tub, a valve controlled inlet for admitting fluid under pressure behind said diaphragm to cause the same to contract the space occupied by the clothes in the tub, a valve controlling discharge of said fluid, control mechanism for the water means and the fluid valves, so constructed and arranged as to admit pressure fluid behind the diaphragm to cause the same to contract the space occupied by the clothes in the tub so as to discharge wash water from the tub and to compress the clothes, to shut off the supply of pressure fluid, to discharge the fluid from behind said diaphragm, to admit rinsing water to the tub, to thereafter admit pressure fluid behind the diaphragm to cause the same to contract the space occupied by the clothes in the tub so as to remove rinse water from the tub and to compress the clothes to dry the same, to shut off the supply of pressure fluid, to discharge the fluid from behind the diaphragm, and for delaying the operation of the discharge valve after the clothes are compressed to dry the same.*

GEORGE C. GRAHAM.

REFERENCES CITED

The following references are of record in the file of this patent or the original patent:

UNITED STATES PATENTS

| Number | Name | Date |
|---|---|---|
| Re. 20,424 | Rocke | June 22, 1937 |
| 872,478 | Thom | Dec. 3, 1907 |
| 1,531,922 | Graham | Mar. 31, 1925 |
| 1,531,924 | Graham | Mar. 31, 1925 |
| 1,547,266 | Robe | July 28, 1925 |
| 1,639,024 | Carroll | Aug. 16, 1927 |
| 1,639,368 | Carroll | Aug. 16, 1927 |
| 1,698,303 | Guyot | Jan. 8, 1929 |
| 1,849,283 | Crane | Mar. 15, 1932 |
| 1,849,896 | Weiman | Mar. 15, 1932 |
| 1,866,779 | Snyder | July 12, 1932 |
| 1,888,392 | Penick | Nov. 22, 1932 |
| 1,892,441 | Wales | Dec. 27, 1932 |
| 1,895,472 | McCune | Jan. 31, 1933 |
| 1,983,750 | Gibson | Dec. 11, 1934 |

(Other references on following page)

UNITED STATES PATENTS

| Number | Name | Date |
|---|---|---|
| 1,985,485 | Crane | Dec. 25, 1934 |
| 2,017,802 | Hume | Oct. 15, 1935 |
| 2,030,394 | Pierce | Feb. 11, 1936 |
| 2,053,932 | Zimarik | Sept. 8, 1936 |
| 2,055,031 | Hutchings | Sept. 22, 1936 |
| 2,114,776 | Davis | Apr. 19, 1938 |
| 2,161,604 | Watts | June 6, 1939 |
| 2,168,068 | Loweke | Aug. 1, 1939 |

| Number | Name | Date |
|---|---|---|
| 2,176,446 | Pickerell | Oct. 17, 1939 |
| 2,187,770 | Chamberlin | Jan. 23, 1940 |
| 2,199,775 | Bassett | May 7, 1940 |
| 2,225,407 | Bassett | Dec. 17, 1940 |
| 2,265,516 | Chayie | Dec. 9, 1941 |

FOREIGN PATENTS

| Number | Country | Date |
|---|---|---|
| 186,917 | Switzerland | Oct. 15, 1936 |
| 471,970 | Great Britain | Sept. 15, 1937 |